United States Patent
Ahn et al.

(10) Patent No.: US 10,911,186 B2
(45) Date of Patent: *Feb. 2, 2021

(54) WIRELESS COMMUNICATION TERMINAL AND WIRELESS COMMUNICATION METHOD FOR MULTI-USER CONCURRENT TRANSMISSION

(71) Applicants: WILUS INSTITUTE OF STANDARDS AND TECHNOLOGY INC., Seoul (KR); SK TELECOM CO., LTD., Seoul (KR)

(72) Inventors: Woojin Ahn, Seoul (KR); Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,829

(22) Filed: Apr. 8, 2019

(65) Prior Publication Data

US 2019/0238272 A1    Aug. 1, 2019

Related U.S. Application Data

(63) Continuation of application No. 15/555,075, filed as application No. PCT/KR2016/002199 on Mar. 4, 2016, now Pat. No. 10,305,638.

(30) Foreign Application Priority Data

Mar. 4, 2015   (KR) .................. 10-2015-0030369
Mar. 17, 2015  (KR) .................. 10-2015-0036754
May 13, 2015   (KR) .................. 10-2015-0066670

(51) Int. Cl.
*H04L 1/16*    (2006.01)
*H04W 72/04*   (2009.01)
(Continued)

(52) U.S. Cl.
CPC .......... *H04L 1/1664* (2013.01); *H04L 1/1614* (2013.01); *H04L 1/1621* (2013.01);
(Continued)

(58) Field of Classification Search
None
See application file for complete search history.

(56) References Cited

U.S. PATENT DOCUMENTS

2006/0034317 A1   2/2006  Hong
2012/0314697 A1   12/2012 Noh
(Continued)

FOREIGN PATENT DOCUMENTS

WO   2011/102575   8/2011
WO   2014/171788   10/2014

OTHER PUBLICATIONS

International Search Report for PCT/KR2016/002199 dated Jul. 8, 2016 and its English translation from WIPO.
(Continued)

*Primary Examiner* — Hassan A Phillips
*Assistant Examiner* — Guatam Sharma
(74) *Attorney, Agent, or Firm* — Ked & Associates, LLP

(57) ABSTRACT

The present invention relates to a wireless communication terminal and a wireless communication method for efficiently managing simultaneous data transmissions of a plurality of terminals. To this end, provided are a base wireless communication terminal including: a transceiver configured to transmit and receive a wireless signal; and a processor configured to control an operation of the base wireless communication terminal, wherein the processor is config-
(Continued)

ured to: transmit a trigger frame triggering a multi-user uplink transmission of a plurality of terminals, receive multi-user uplink data through resources allocated to the plurality of terminals, and transmit a block ACK through the resources in response to the received multi-user uplink data, wherein the transmission of the block ACK in each resource is terminated at the same time, and a wireless communication method using the same.

18 Claims, 21 Drawing Sheets

(51) Int. Cl.
H04W 72/12 (2009.01)
H04W 74/08 (2009.01)

(52) U.S. Cl.
CPC ....... *H04L 1/1671* (2013.01); *H04W 72/0413* (2013.01); *H04W 72/121* (2013.01); *H04W 72/1231* (2013.01); *H04W 72/1284* (2013.01); *H04W 74/085* (2013.01)

(56) References Cited

U.S. PATENT DOCUMENTS

| | | |
|---|---|---|
| 2013/0286959 A1 | 10/2013 | Lou et al. |
| 2013/0301569 A1 | 11/2013 | Wang et al. |
| 2015/0003367 A1* | 1/2015 | Seok .................. H04W 74/002 370/329 |
| 2016/0165574 A1* | 6/2016 | Chu ..................... H04L 5/0007 370/312 |
| 2016/0227437 A1 | 8/2016 | Blanksby |
| 2017/0250784 A1 | 8/2017 | Sakai |
| 2017/0272138 A1* | 9/2017 | Chun ..................... H04L 29/08 |
| 2017/0373813 A1 | 12/2017 | Asterjadhi |

OTHER PUBLICATIONS

Written Opinion of the International Searching Authority for PCT/KR2016/002199 dated Jul. 8, 2016 and its English machine translation by Google Translate.

Ahn, Woo Jin et al., "UL-OFMA Procedure in IEEE 802.11ax", IEEE 802.11-15/0091r1, Jan. 13, 2015, slides 3-10.

U.S. Office Action dated Jul. 2, 2018 issued in U.S. Appl. No. 15/555,075.

* cited by examiner

Target BSS

WIRELESS COMMUNICATION TERMINAL AND WIRELESS COMMUNICATION METHOD FOR MULTI-USER CONCURRENT TRANSMISSION

CROSS-REFERENCE TO RELATED PATENT APPLICATIONS

This application is a continuation of U.S. patent application Ser. No. 15/555,075, filed Jan. 2, 2018, which is a U.S. National Stage Application under 35 U.S.C. § 371 of PCT Application No. PCT/KR2016/002199, filed Mar. 4, 2016, which claims priority to Korean Patent Application No's. 10-2015-0030369, filed Mar. 4, 2015, 10-2015-0036754, filed Mar. 17, 2015 and 10-2015-0066670, filed May 13, 2015, whose entire disclosures are hereby incorporated by reference.

TECHNICAL FIELD

The present invention relates to a wireless communication terminal and a wireless communication method for a simultaneous multi-user transmission, and more particularly, to a wireless communication terminal and a wireless communication method for efficiently managing simultaneous data transmissions of a plurality of terminals.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

In addition, the present invention has an object to reduce the possibility of collision of data transmission of a plurality of terminals in a dense user environment and to provide a stable data communication environment.

Also, the present invention has an object to provide a method by which a plurality of terminals can efficiently perform simultaneous multi-user transmission.

Technical Solution

In order to achieve the objects, the present invention provides a wireless communication method and a wireless communication terminal as below.

First, an exemplary embodiment of the present invention provides a base wireless communication terminal, including: a transceiver configured to transmit and receive a wireless signal; and a processor configured to control an operation of the base wireless communication terminal, wherein the processor transmits a trigger frame triggering a multi-user uplink transmission of a plurality of terminals, receives multi-user uplink data through resources allocated to the plurality of terminals, and transmits a block ACK through the resources in response to the received multi-user uplink data, wherein the transmission of the block ACK in each resource is terminated at the same time.

According to an embodiment, the processor may perform padding on the block ACK transmitted through at least one resource to match termination points of block ACK transmissions in each resource.

According to another embodiment, the processor may insert duplicated ACK information into the block ACK transmitted through at least one resource to match termination points of block ACK transmissions in each resource.

In addition, a predetermined padding may be performed before a frame check sequence (FCS) field of the trigger frame.

In this case, the transmission of the trigger frame may be terminated at the same time in each resource through which the trigger frame is transmitted.

In addition, the resource may be a channel or a sub-channel.

According to an embodiment, a transmission packet of the multi-user uplink data may include a legacy preamble and a non-legacy preamble, and the legacy preamble may be received as common information on a 20 MHz channel basis.

In addition, the non-legacy preamble may include HE-SIG-A and remaining fields, and the HE-SIG-A may be received as common information on a 20 MHz channel basis, and the remaining fields of the non-legacy preambles may be received as individual information for each resource allocated to each terminal.

In this case, the remaining fields of the non-legacy preamble may include HE-STF and HE-LTF.

According to an embodiment, the multi-user uplink data transmission in each resource may be terminated at the same time.

In this case, the uplink data transmitted through at least one resource may be padded to terminate the multi-user uplink data transmission at the same time.

In addition, an exemplary embodiment of the present invention provides a wireless communication method of a base wireless communication terminal, including: transmitting a trigger frame triggering a multi-user uplink transmission of a plurality of terminals; receiving multi-user uplink data through resources allocated to the plurality of terminals; and transmitting a block ACK through the resources in response to the received multi-user uplink data; wherein the transmission of the block ACK in each resource is terminated at the same time.

Advantageous Effects

According to an embodiment of the present invention, efficient multi-user uplink transmission scheduling is possible in a contention-based channel access system.

Also, according to the embodiment of the present invention, it is possible to reduce unnecessary channel occupancy and increase total spectral efficiency of the network in a multi-user uplink transmission process.

In addition, according to the embodiment of the present invention, it is possible to prevent malfunction of the wireless LAN network by aligning the lengths of block ACKs transmitted through a plurality of channels, and at the same time, it is possible to secure transmission time of a control frame of an AP.

According to the embodiment of the present invention, it is possible to increase the total resource utilization rate in the contention-based channel access system and improve the performance of the wireless LAN system.

BEST MODE

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2015-0030369, 10-2015-0036754 and 10-2015-0066670 filed in the Korean Intellectual Property Office and the embodiments and mentioned items described in the respective application, which forms the basis of the priority, shall be included in the Detailed Description of the present application.

Figure 1:
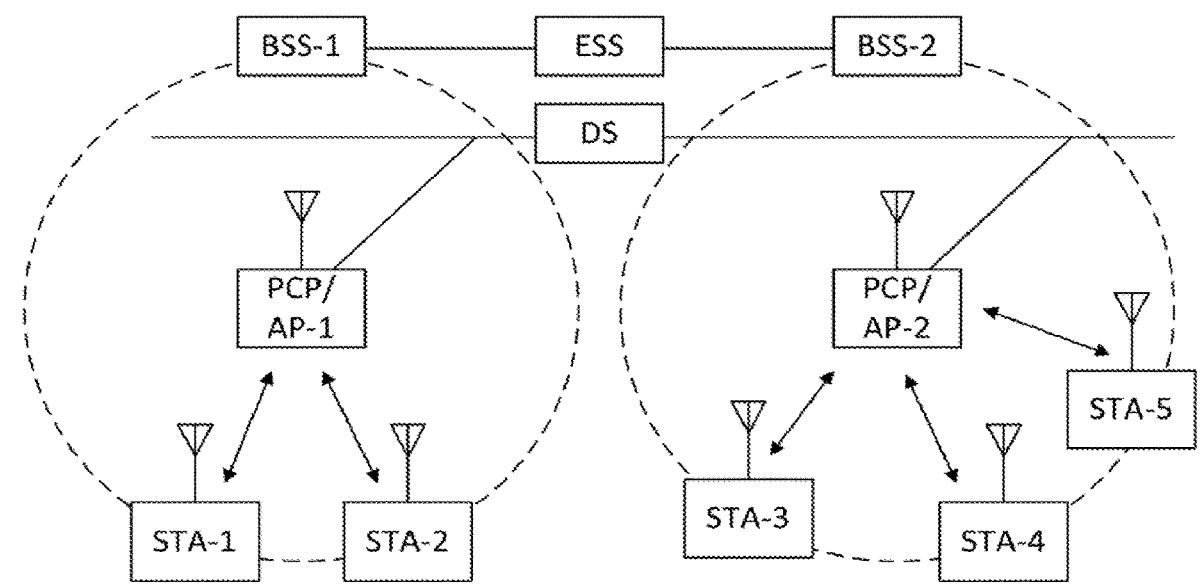
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
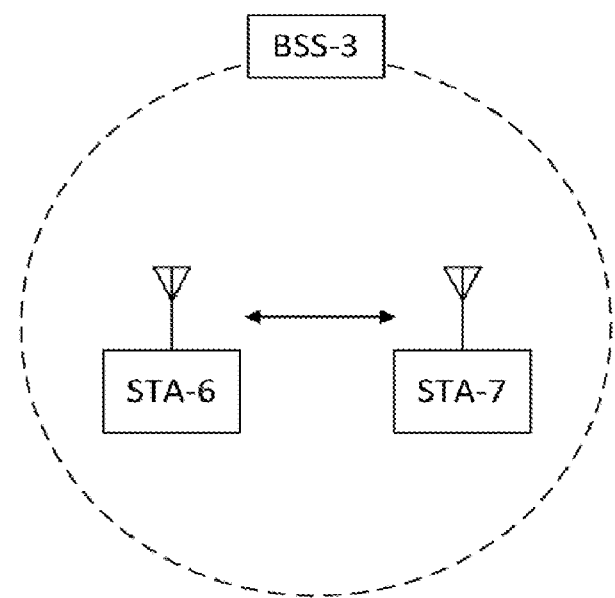
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
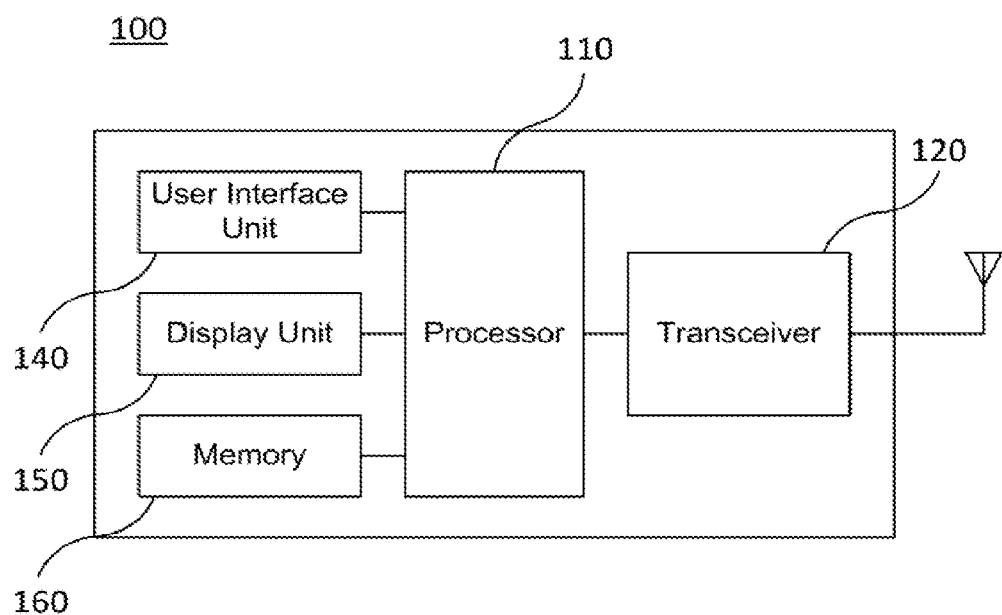
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
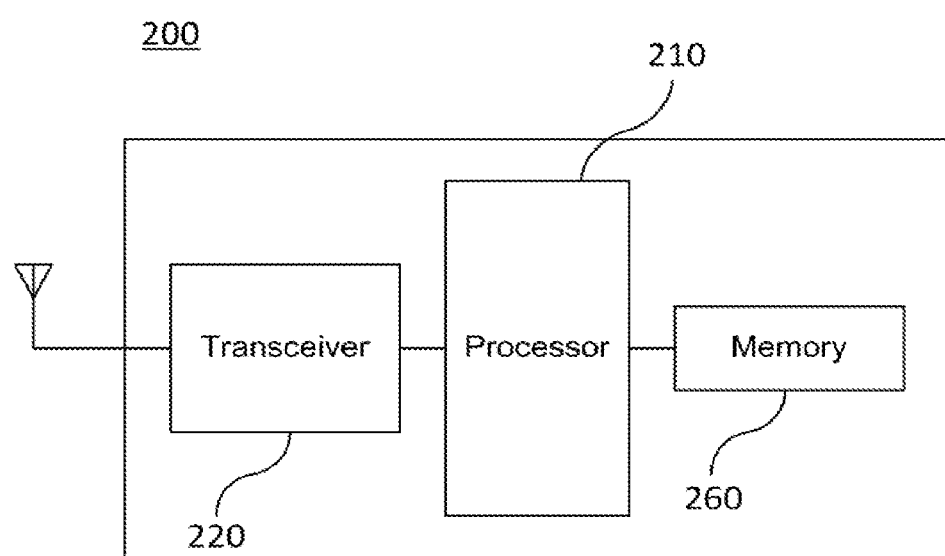
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as wireless signal transmission/reception of the AP 200 according to the embodiment of the present invention. A detailed embodiment thereof will be described below.

Figure 5:
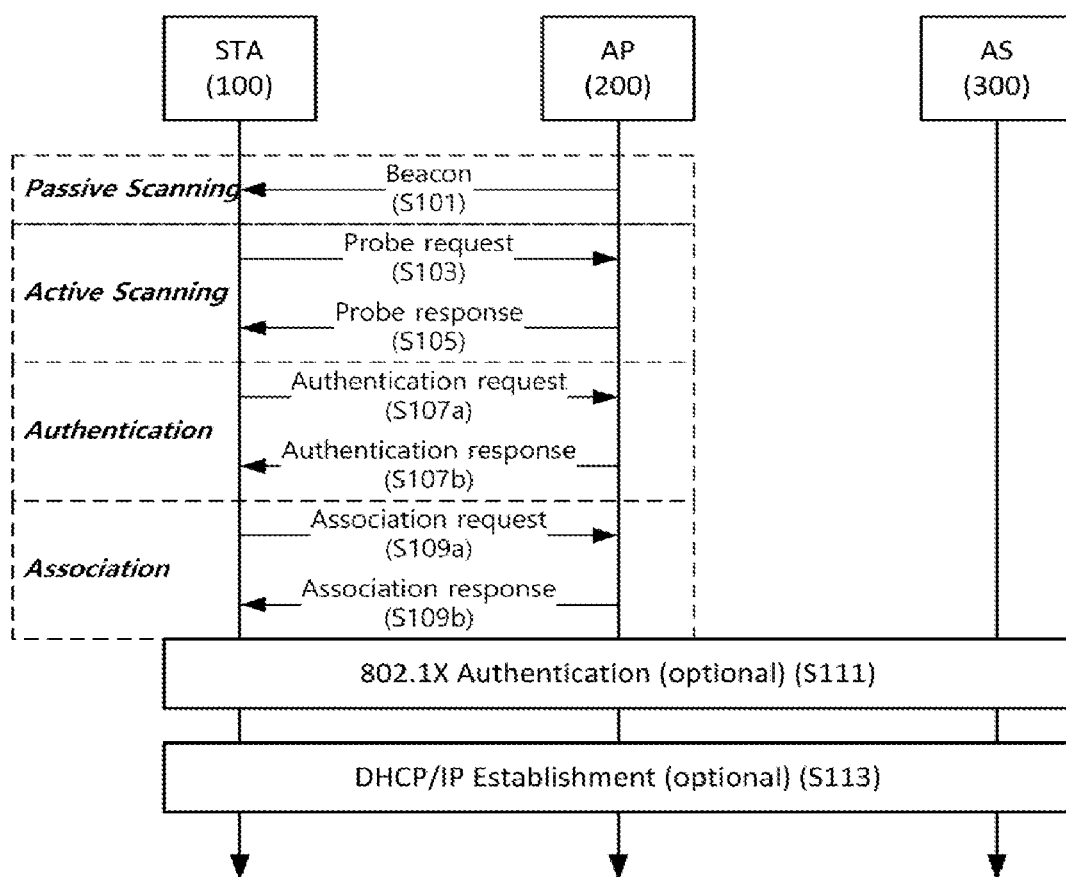
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
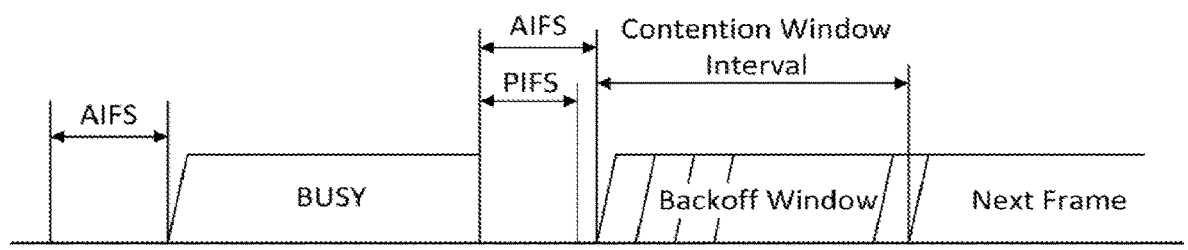
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an interframe space (IFS) time depending on a situation of each lei final, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number assigned to the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
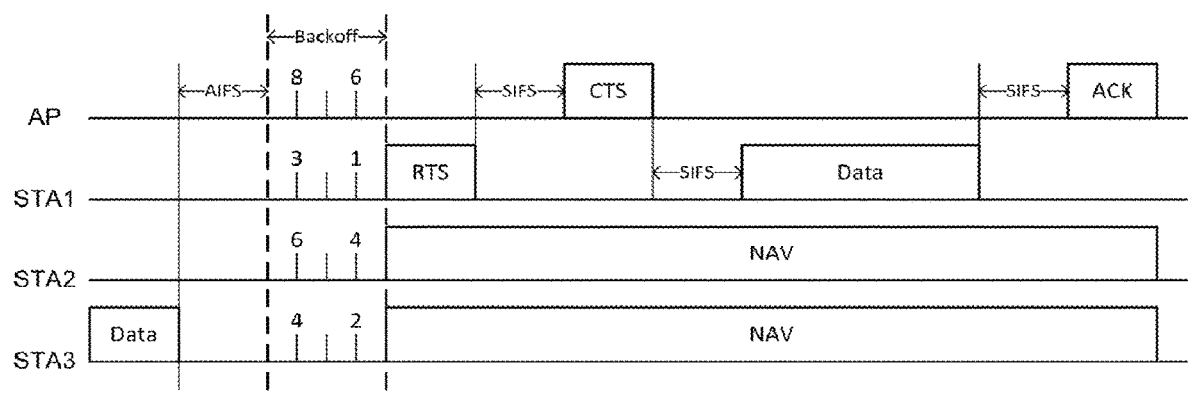
FIG. 7 illustrates a method for performing a distributed coordination function (DCF) using a request to send (RTS) frame and a clear to send (CTS) frame.

FIG. 7 is a diagram illustrating a method for performing a distributed coordination function using a request to send (RTS) frame and a clear to send (CTS) frame.

The AP and STAs in the BSS contend in order to obtain an authority for transmitting data. When data transmission at the previous step is completed, each terminal having data to be transmitted performs a backoff procedure while decreasing a backoff counter (alternatively, a backoff timer) of a random number allocated to each terminal after an AFIS time. A transmitting terminal in which the backoff counter expires transmits the request to send (RTS) frame to notify that corresponding terminal has data to transmit. According to an exemplary embodiment of FIG. 7, STA1 which holds a lead in contention with minimum backoff may transmit the RTS frame after the backoff counter expires. The RTS frame includes information on a receiver address, a transmitter address, and duration. A receiving terminal (i.e., the AP in FIG. 7) that receives the RTS frame transmits the clear to send (CTS) frame after waiting for a short IFS (SIFS) time to notify that the data transmission is available to the transmitting terminal STA1. The CTS frame includes the information on a receiver address and duration. In this case, the receiver address of the CTS frame may be set identically to a transmitter address of the RTS frame corresponding thereto, that is, an address of the transmitting terminal STA1.

The transmitting terminal STA1 that receives the CTS frame transmits the data after a SIFS time. When the data transmission is completed, the receiving terminal AP transmits an acknowledgment (ACK) frame after a SIFS time to notify that the data transmission is completed. When the transmitting terminal receives the ACK frame within a predetermined time, the transmitting terminal regards that the data transmission is successful. However, when the transmitting terminal does not receive the ACK frame within the predetermined time, the transmitting terminal regards that the data transmission is failed. Meanwhile, adjacent terminals that receive at least one of the RTS frame and the CTS frame in the course of the transmission procedure set a network allocation vector (NAV) and do not perform data transmission until the set NAV is terminated. In this case, the NAV of each terminal may be set based on a duration field of the received RTS frame or CTS frame.

In the course of the aforementioned data transmission procedure, when the RTS frame or CTS frame of the terminals is not normally transferred to a target terminal (i.e., a terminal of the receiver address) due to a situation such as interference or a collision, a subsequent process is suspended. The transmitting terminal STA1 that transmitted the RTS frame regards that the data transmission is unavailable and participates in a next contention by being allocated with a new random number. In this case, the newly allocated random number may be determined within a range (2*CW) twice larger than a previous predetermined random number range (a contention window, CW).

Multi-User Uplink Transmission

Figure 8:
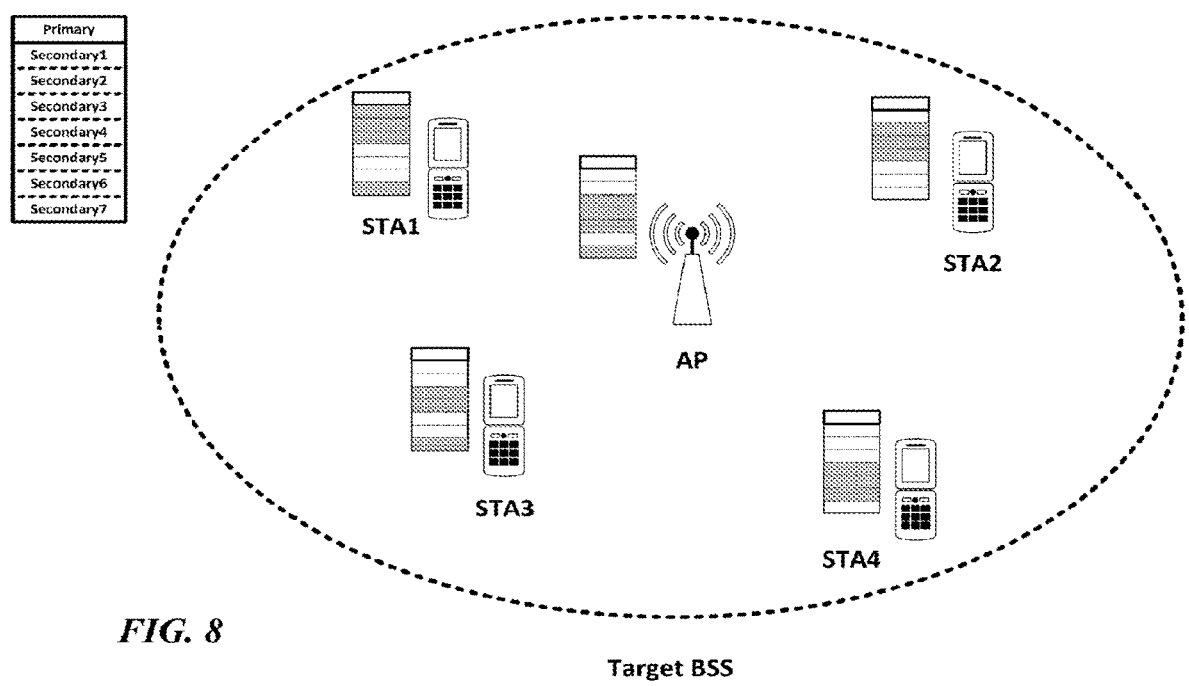
FIG. 8 illustrates a wireless LAN network according to an embodiment of the present invention.

FIG. 8 illustrates a wireless LAN network according to an embodiment of the present invention. In FIG. 8, a BSS consists of an AP and a plurality of STAs (STA1, STA2, STA3 and STA4) associated therewith. The blocks shown with each terminal represents the channel state measured at the corresponding terminal. A shadow block indicates a busy channel, and a white block indicates an idle channel.

When using an orthogonal frequency division multiple access (OFDMA) or a multi-input multi-output (MIMO), one wireless communication terminal can simultaneously transmit data to a plurality of wireless communication terminals. Further, one wireless communication terminal can simultaneously receive data from a plurality of wireless communication terminals. For example, a multi-user downlink transmission in which an AP simultaneously transmits data to a plurality of STAs, and a multi-user uplink transmission in which a plurality of STAs simultaneously transmit data to the AP may be performed.

In order to perform the multi-user uplink transmission, the channel to be used and the transmission start time of each STA that performs uplink transmission should be adjusted. However, in a wireless LAN environment in which a plurality of BSSs are adjacent to each other, the measured channel states may be different from each other in the same BSS as shown in FIG. 8. That is, depending on the influence of the adjacent external BSS of each terminal, channels to which each terminal can access may be different from each other. In addition, whether or not each STA has data for uplink transmission changes in real time. Therefore, in order to efficiently schedule the multi-user uplink transmission, state information of each STA needs to be transmitted to the AP.

According to an embodiment of the present invention, information for scheduling of a multi-user uplink transmission may be indicated through a predetermined field of a preamble of a packet and/or a predetermined field of a MAC header. For example, a STA may indicate information for multi-user uplink transmission scheduling through a predetermined field of a preamble or a MAC header of an uplink transmission packet, and may transmit the information to an AP. In this case, the information for multi-user uplink transmission scheduling includes at least one of buffer status information of each STA, channel state information measured by each STA. The buffer status information of the STA may indicate at least one of whether the STA has uplink data to be transmitted, the access class (AC) of the uplink data and the size (or the transmission time) of the uplink data.

Figure 9:
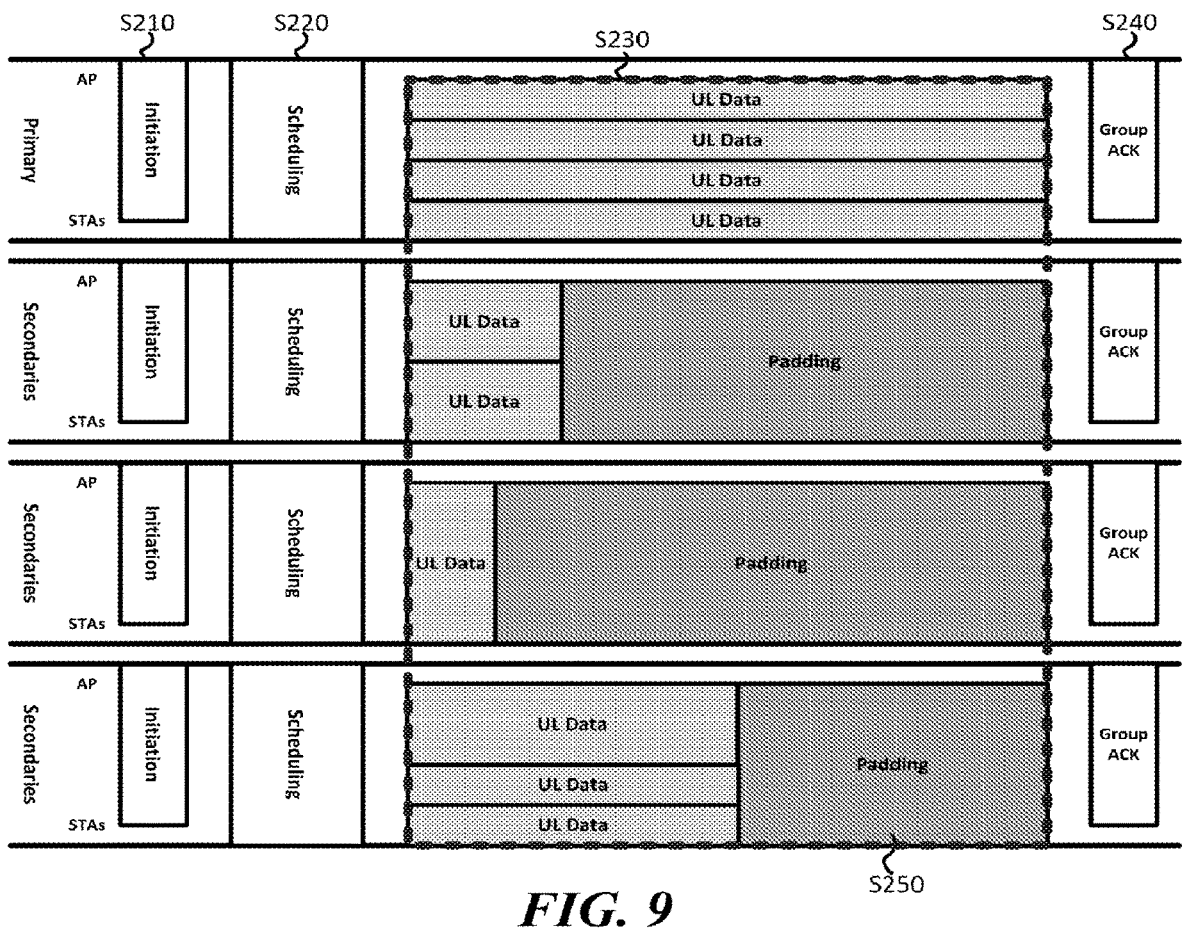
FIG. 9 illustrates a sequence of processes in which a multi-user uplink transmission is performed according to an embodiment of the present invention.

FIG. 9 illustrates a sequence of processes in which a multi-user uplink transmission is performed. As described above, the multi-user uplink transmission process may be managed by the AP because a plurality of terminals simultaneously transmit data. Therefore, in order to allocate resources and prevent data collision, the AP should obtain the buffer status information of each STA and deliver the accurate transmission time point information to each STA before the start of multi-user uplink transmission. The buffer status information of the STA may indicate at least one of whether the STA has uplink data to be transmitted, the access category (AC) of the uplink data, and the size (or the transmission time) of the uplink data. Such information delivery of each STA may be performed through an initialization step S210 and a scheduling step S220 for the multi-user uplink transmission.

According to an embodiment of the present invention, the scheduling step S220 for the multi-user uplink transmission is performed in advance to collect related information, and the initialization step S210 may be performed if a specific condition is satisfied. Alternatively, the initialization step S210 may be performed in advance according to the time condition, and then the scheduling step S220 may be performed next to collect the related information. The initializing step S210 and the scheduling step S220 include a process of exchanging information on channels available to the AP and the STA. According to an exemplary embodiment, the AP may transmit available channel information to a plurality of STAs in advance, and the plurality of STAs may feedback channel information available to the corresponding STA among the channels available to the AP. The specific operation method of the initializing step S210 and the scheduling step S220 in the embodiment of the present invention is not limited thereto. According to an embodiment, the initialization step S210 and the scheduling step S220 may be performed with an integrated operation.

When the initialization step S210 and the scheduling step S220 are performed, a multi-user uplink data transmission step S230 is performed. At least one STA assigned a channel or a sub-channel from the AP simultaneously transmits uplink data at the time point designated by the AP. The STA may perform uplink data transmission through a 20 MHz channel basis or a wideband channel basis over the 20 MHz. In addition, the non-legacy STA may perform uplink data transmission through a sub-channel basis smaller than 20 MHz. In the embodiment of the present invention, a term resource may be used for comprehensively meaning a channel or a sub-channel allocated to the STAs. The AP receiving the uplink data from the STA transmits an ACK in response thereto (S240). If uplink data transmission is performed through a sub-channel basis, a plurality of STAs can transmit uplink data through one channel. In this case, the AP may transmit a group ACK through the corresponding channel to transmit an ACK for a plurality of STAs that transmitted the uplink data.

In case of being affected by a plurality of external BSSs in a dense BSS environment, the available channels of each terminal may be different from each other according to the geographical location of the wireless terminal. Therefore, the number of terminals capable of data transmission through each channel may be different from each other. In this case, as shown in FIG. 9, the air time during which actual uplink data transmission is performed may be different for each channel. However, if the AP cannot simultaneously perform data transmission and reception, the AP cannot transmit an ACK through another channel in which uplink data transmission has been completed while receiving uplink data through a channel in which the air time is long. Therefore, the STAs using the channel in which the air time is short may perform zero padding until the uplink data transmission of a channel having the longest air time is completed, to wait for ACK reception (S250). That is, the padding is performed on the uplink data transmitted through at least one channel, so that the multi-user uplink data transmission in each channel can be terminated at the same time.

However, when the zero padding is performed, STAs occupy the channel regardless of data transmission, thus the overall spectral efficiency is lowered. In addition, terminals of other BSSs using the channel as a primary channel cannot perform communication during the zero padding period, and thus directly experience a decrease in performance. Therefore, there is a need for an ACK transmission method for further improving the data transmission efficiency of the terminals.

Figure 10:
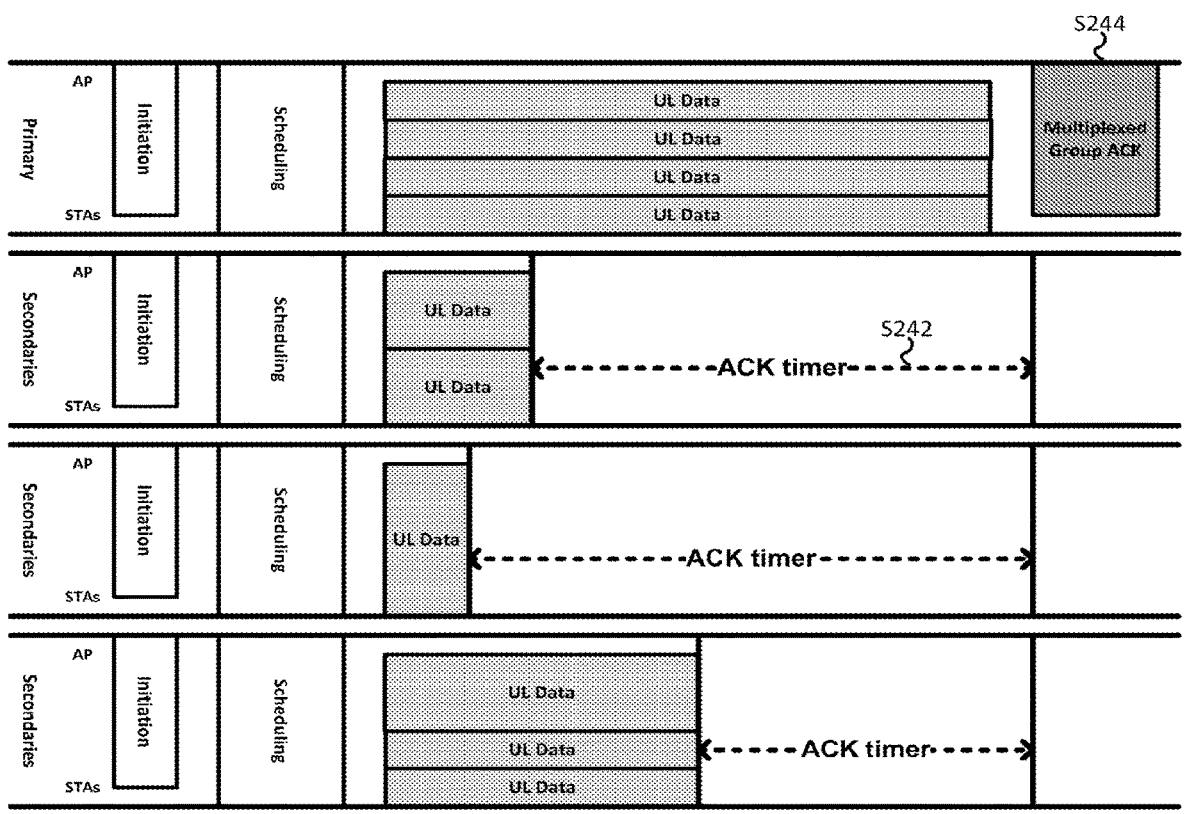
FIG. 10 illustrates an ACK transmission method for a multi-user uplink transmission according to an embodiment of the present invention.

FIG. 10 illustrates an ACK transmission method for multi-user uplink transmission according to an embodiment of the present invention. When the multi-user uplink transmission is completed, the AP transmits a multiplexed group ACK in response thereto (S244). In this case, the AP may transmit the multiplexed group ACK through a first channel having the longest air time among the plurality of channels in which the multi-user uplink transmission is performed. According to an embodiment, the first channel having the longest air time may be the primary channel of the BSS.

The STAs in which a channel other than the first channel is assigned as the uplink data transmission channel set an ACK timer at the time when the uplink data transmission of the corresponding channel ends, and wait for ACK reception until the set ACK timer expires (S242). In this case, the other channel may be a channel other than the first channel having the longest air time, that is, a secondary channel of the corresponding BSS. The ACK timer of each channel indicates the time from when the uplink data transmission of the corresponding channel is completed to when the multiplexed group ACK is transmitted. For the setting of the ACK timer, each STA should obtain information on the transmission time point of the multiplexed group ACK. The transmission time point information of the multiplexed group ACK may be transmitted to each STA which is intended to perform uplink data transmission in the initialization step S210 and/or the scheduling step S220. According to an exemplary embodiment, the STA that the ACK timer is set may switch to a sleep mode until the corresponding timer expires to perform a power saving.

As described above, according to the embodiment of the present invention, each secondary channel can be returned immediately after the uplink data transmission is completed. Therefore, the terminals of the external BSS using the corresponding secondary channel as a primary channel may access the channel and transmit data at an earlier time point. Thus, the overall spectral efficiency of the network can be improved.

Figure 11:
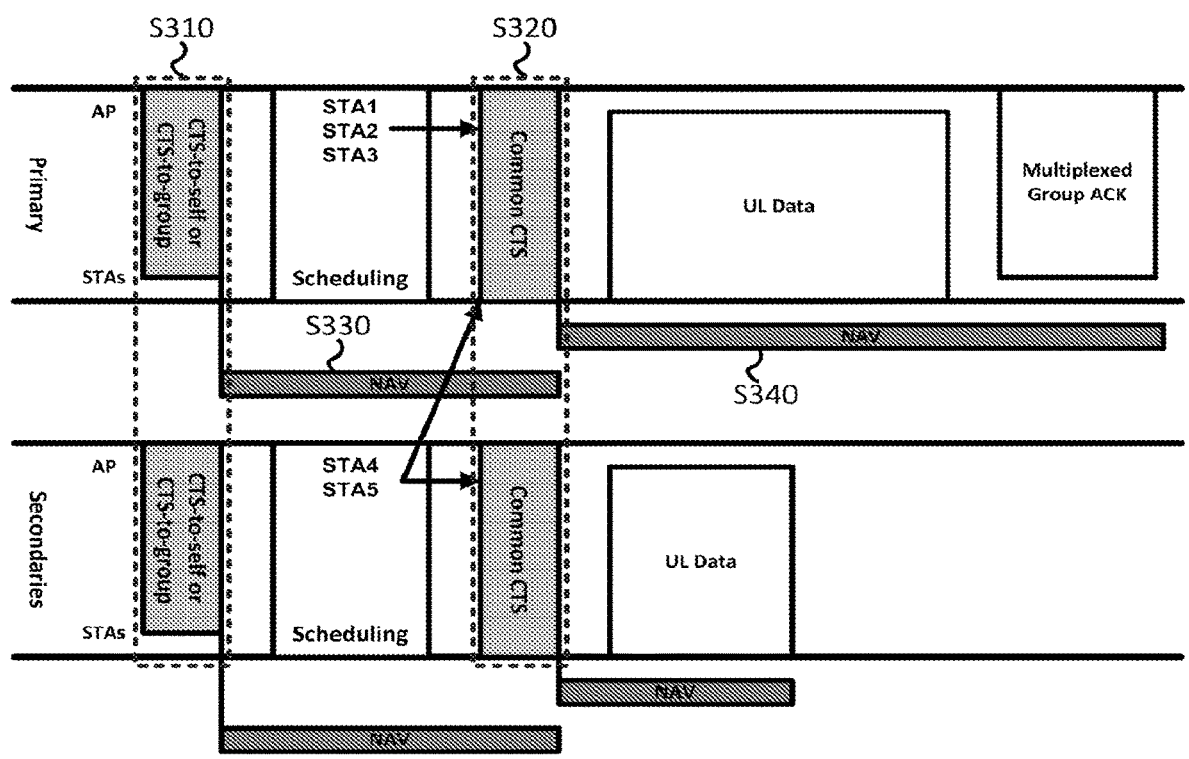
FIG. 11 illustrates a NAV setting method for a multi-user uplink transmission according to an embodiment of the present invention.

FIG. 11 illustrates a NAV setting method for a multi-user uplink transmission according to an embodiment of the present invention. In the embodiment of FIG. 11, the same or corresponding parts as those of the embodiment of FIG. 10 described above will be omitted.

According to an embodiment of the present invention, in order to protect the multi-user uplink transmission process, a NAV setting frame may be transmitted. First, the AP transmits the first NAV setting frame at the start time of the multi-user uplink transmission (S310). The actual transmission length of the multi-user uplink transmission may vary depending on the uplink transmission data length and the resource allocation result of the STAs. Thus, the duration field value of the first NAV setting frame may be set to durations of the initialization step and the scheduling step. The first NAV setting frame may be an RTS or CTS of a predetermined format. According to an embodiment, the first NAV setting frame may be one of a predefined multi-user RTS, RTS-to-self, CTS-to-self and CTS-to-group.

When the resource allocation of each STA is completed in the scheduling step, an air time in which uplink data transmission is performed for each channel is calculated. Accordingly, second NAV setting frames are transmitted for setting a NAV during a period in which the multi-user uplink transmission and the multiplexed group ACK transmission are performed (S320). The second NAV setting frame may be simultaneously transmitted by a plurality of STAs in which resource is allocated and participate in the multi-user uplink data transmission. Alternatively, a plurality of STAs and an AP may simultaneously transmit the second NAV setting frame. According to an embodiment, the second NAV setting frame may be configured in a CTS frame format. In this case, second NAV setting frames simultaneously transmitted by a plurality of STAs and/or the AP may be set to the same waveform.

The NAVs of the neighboring terminals are set based on the first NAV setting frame and the second NAV setting frame transmitted as above (S330, S340). Since the second NAV setting frames having the same waveform are simultaneously transmitted on a 20 MHz channel basis, the neighboring terminals including legacy terminals can receive the second NAV setting frame and set a NAV. When the simultaneously transmitted second NAV setting frames have the same waveform for each channel, the second NAV setting frame may have duration information reflecting the air time of the corresponding channel. Accordingly, a terminal of an external BSS that has acquired the NAV information set on the specific channel can access the corresponding channel immediately after the NAV time has expired.

On the other hand, when the multiplexed group ACK is used as in the embodiment of FIG. 10, STAs that have transmitted uplink data through secondary channels receive the multiplexed group ACK through the primary channel. If the STAs set the NAV only for the secondary channel through which the uplink data is transmitted, terminals of the external BSS adjacent to the STA may regard the primary channel as idle and perform an access to the primary channel. In this case, STAs that have been transmitted the uplink data through the secondary channels may not be able to receive the multiplexed group ACK transmitted through the primary channel.

Therefore, according to the embodiment of the present invention, the STAs transmitting uplink data through the secondary channel transmit the second NAV setting frame through the primary channel and the secondary channel. In this case, the primary channel through which the second NAV setting frame is transmitted is a primary channel of the BSS to which the corresponding STA belongs. In addition, the secondary channel through which the second NAV setting frame is transmitted is a secondary channel through which the STA transmits uplink data. Referring to FIG. 11, STA4 and STA5 transmitting uplink data through a secondary channel transmit a second NAV setting frame not only through the secondary channel but also through a primary channel (S320). As described above, the STAs additionally protect the primary channel through which the multiplexed group ACK is transmitted as well as the secondary channel through which the uplink data is transmitted. The duration field value of the second NAV setting frame transmitted through the primary channel is set to the time when the transmission of the multiplexed group ACK is completed. The duration field value of the second NAV setting frame transmitted through the secondary channel is set to the time when the uplink data transmission of the secondary channel is completed. On the other hand, STAT, STA2, and STA3 that transmit uplink data through the primary channel are not required to transmit an additional second NAV setting frame through channels other than the primary channel.

Figure 12:
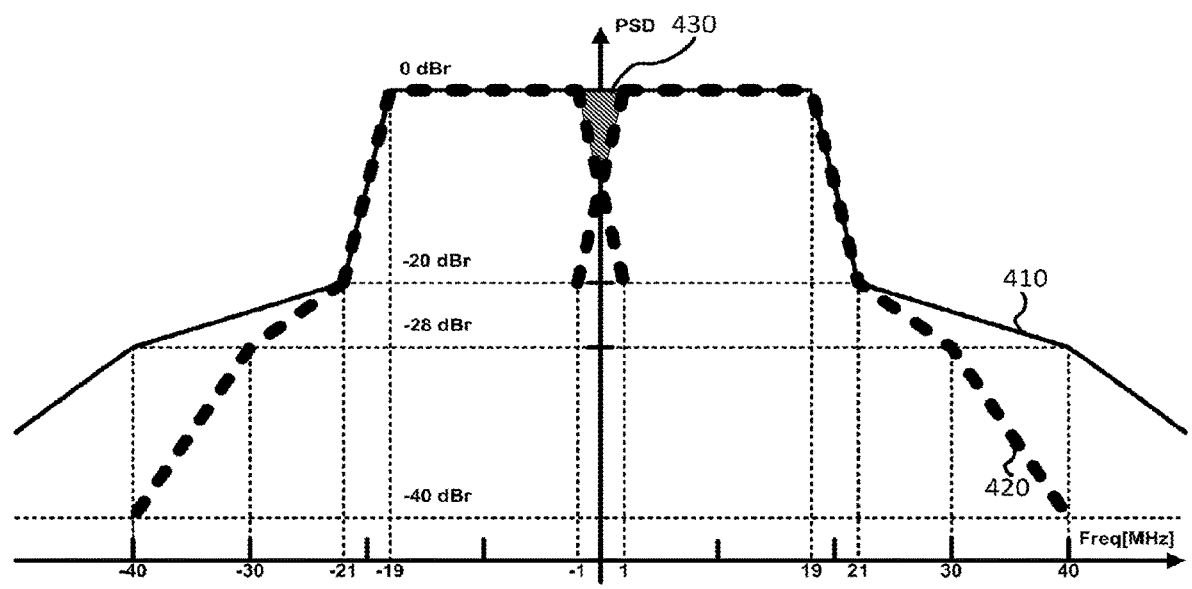
FIG. 12 illustrates a frequency masking method according to the frequency bandwidth in use.

FIG. 12 illustrates a frequency masking method according to the frequency bandwidth in use. In the wireless LAN system, a frequency masking technique is used to minimize mutual interference when different terminals perform communications through adjacent channels. The frequency masking is implemented in a way of intentionally reducing transmission power at the boundary frequencies (i.e., the minimum frequency and the maximum frequency) of the currently used channel. Therefore, the shape of frequency masking is different depending on the bandwidth in which data transmission is performed. That is, the spectral mask 410 of a packet transmitted on a 40 MHz channel has a different shape from the spectral mask 420 of a packet transmitted on two adjacent 20 MHz channels. In particular, each of the spectral masks 410 and 420 has a difference in the presence or absence of the guard band 430 at the central frequency portion of the 40 MHz channel.

Figure 13:
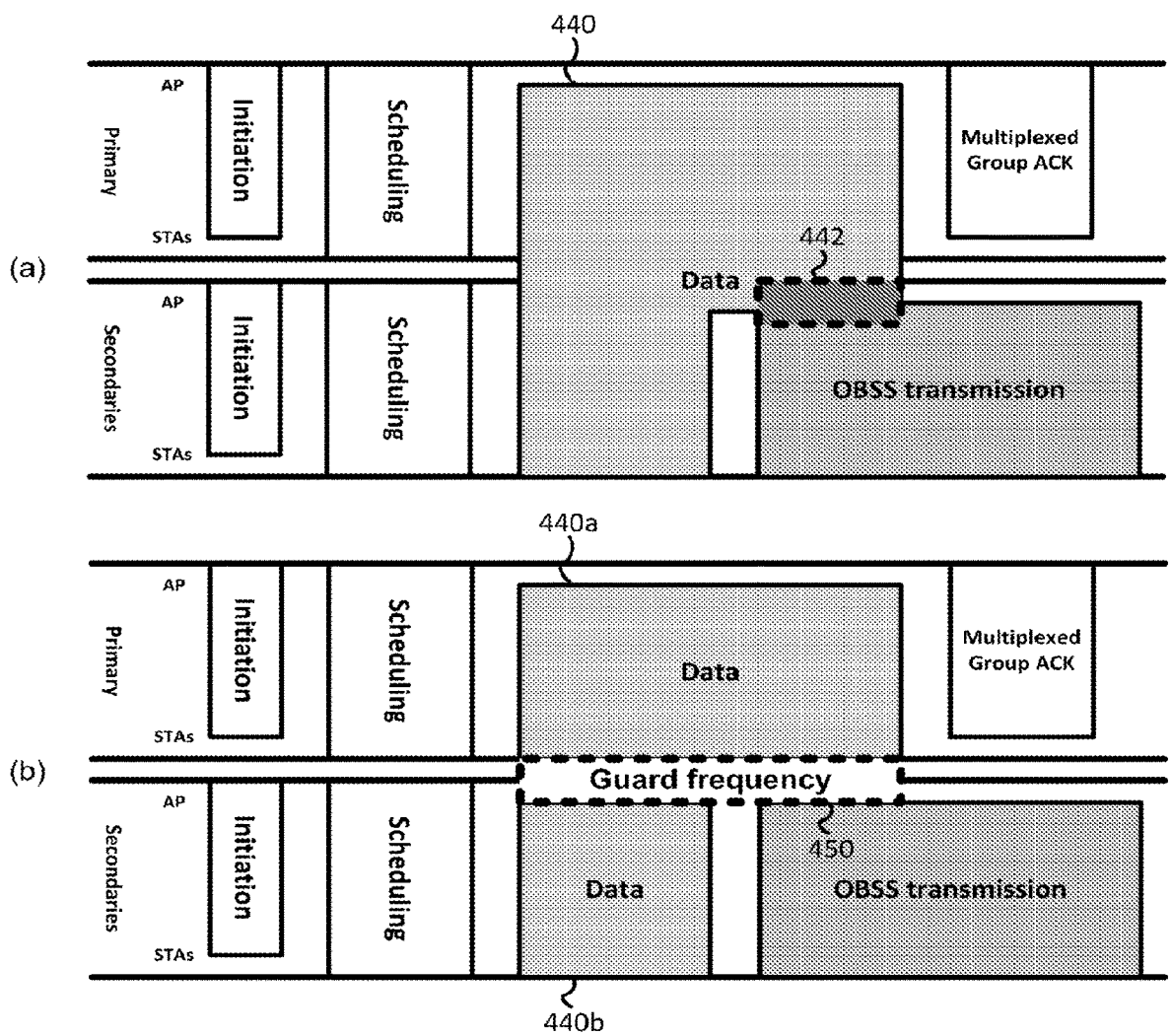
FIG. 13 illustrates a guard band setting method according to an embodiment of the present invention.

FIG. 13 illustrates a guard band setting method according to an embodiment of the present invention.

FIG. 13 (*a*) represents a situation where data 440 is transmitted only through a channel of a second band after a specific time point from the transmission of data 440 through a channel of a first band is started. In the embodiment of the present invention, the second band has a narrower bandwidth than the first band. For example, the first band may represent a 40 MHz bandwidth, and the second band may represent a 20 MHz bandwidth. According to an embodiment of the present invention, the transmission bandwidth may be changed during the transmission of data 440 according to the scheduling of data transmission and the result of resource allocation. Even if the transmission bandwidth is changed in this manner, the spectral mask of the RF chain may be maintained in its original shape. That is, if the transmission band of the data is changed from the first hand to the second hand, data 440 in a form without the guard band 442 may be transmitted. In this case, when the terminal of the external BSS (i.e., OBSS) attempts to transmit on the idle band of the first hand, interference may occur due to absence of the guard band 442 of data transmitted through the second band.

FIG. 13 (*b*) represents an embodiment in which data is transmitted by setting a guard band 450 between two adjacent basic band channels. According to an embodiment of the present invention, when multi-user data transmission is performed, data 440*a* and 440*b* allocated to each terminal may be transmitted through bands below the basic band. In this case, the multi-user data transmission includes a multi-user uplink data transmission and a multi-user downlink data transmission. Further, the basic band may be a 20 MHz band, but the present invention is not limited thereto. In this manner, the guard band 450 in units of the basic band can be formed by setting a resource exceeding the basic band as not to be allocated to a single terminal.

According to another embodiment of the present invention, when a multi-user data transmission is performed, data allocation of a broadband exceeding the basic band may be allowed to each terminal. However, the terminal may perform nulling to the frequency components corresponding to the guard band 450 in the basic band unit among the wideband data, thereby preventing interference with the external BSS terminals.

According to another embodiment of the present invention, if the transmission band is changed from the first band to the second band during data transmission, the terminal may transmit the data by setting the guard band 450 on the basis of the changed second band. That is, if the transmission bandwidth is reduced during data transmission, the terminal sets a spectrum mask based on the reduced transmission bandwidth and transmits the data.

According to another embodiment of the present invention, a multi-user data transmission using a plurality of subbands in the first band may be performed. In this case, each subband has a narrower bandwidth than the first hand. The plurality of subbands may be contiguous channels, or may be non-contiguous channels. In addition, each subband may be set to the same bandwidth, or may be set to a different bandwidth. According to an embodiment of the present invention, a terminal transmits multi-user data by setting a guard band 450 and a spectrum mask based on each subband through which data is transmitted.

Figure 14:
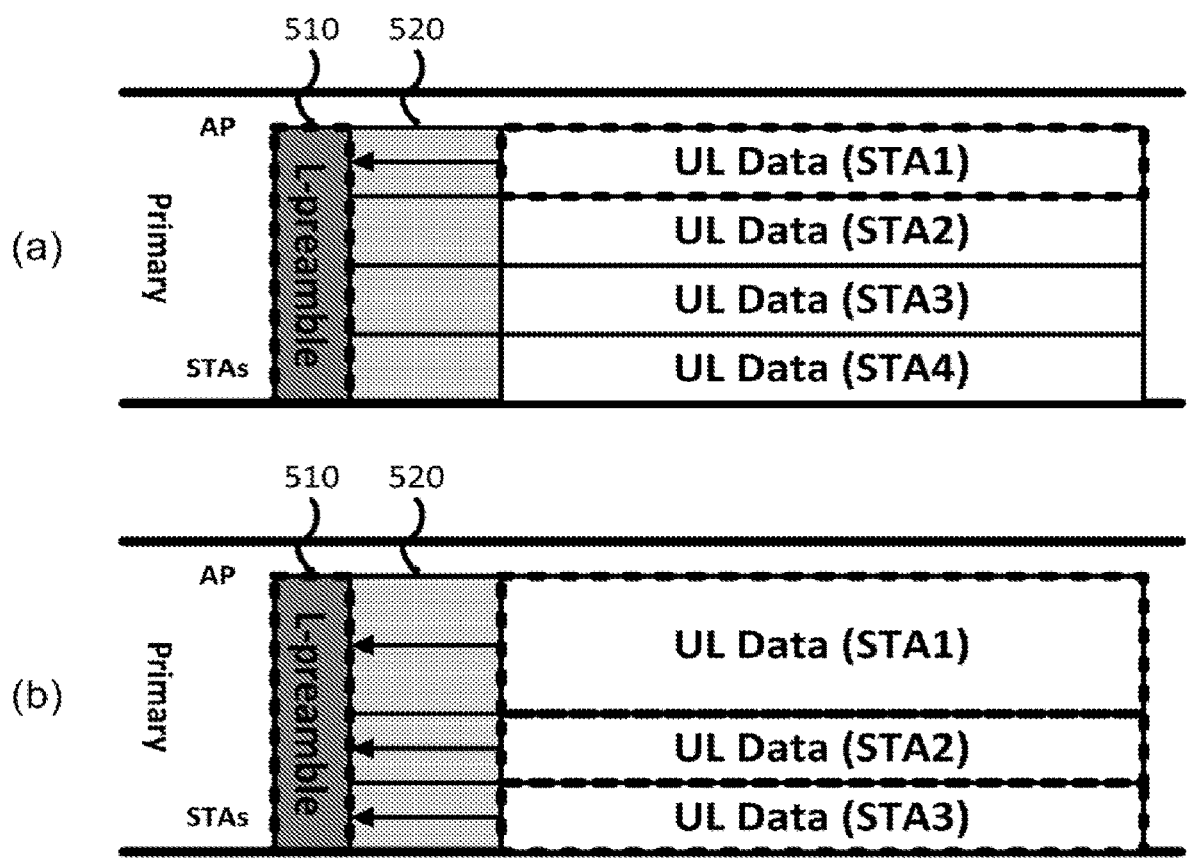
FIG. 14 illustrates a method of transmitting a legacy preamble of a non-legacy terminal in a process of a multi-user uplink data transmission.
Figure 15:
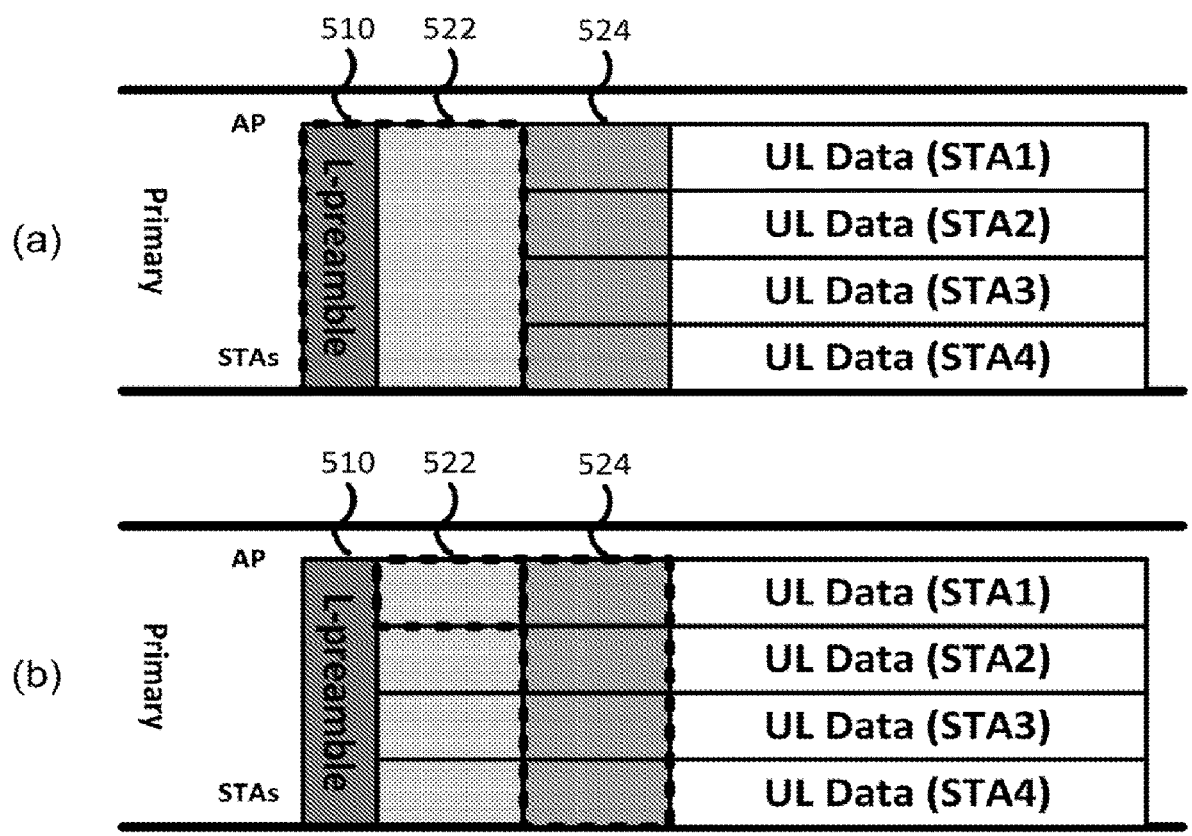
FIG. 15 illustrates a method of configuring a non-legacy preamble in a process of a multi-user data transmission.

FIGS. 14 and 15 illustrate a method of configuring a preamble of a non-legacy packet according to an embodiment of the present invention. More specifically, FIG. 14 illustrates a method of transmitting a legacy preamble (L-preamble) of a non-legacy terminal in a process of a multi-user uplink data transmission. Further, FIG. 15 illustrates a method of configuring a non-legacy preamble in the process of a multi-user data transmission.

The legacy preamble is decodable at the legacy terminals and includes a legacy short training field (L-STF), a legacy long training field (L-LTF), and a legacy signal field (L-SIG). The non-legacy preamble is a field following the legacy preamble and can be recognized only by non-legacy terminals (e.g., an 802.11ax wireless LAN terminal). The non-legacy preamble may include an HE signal A field (HE-SIG-A), an HE signal B field (HE-SIG-B), an HE short training field (HE-STF), an HE long training field (HE-LTF), and the like.

The non-legacy wireless LAN packet includes a legacy preamble for legacy terminals and a non-legacy preamble for non-legacy terminals. The legacy preamble and the non-legacy preamble are inserted at the beginning of a non-legacy PHY Service Data Unit (PSDU). Non-legacy wireless LAN systems may support 256 FFT while legacy wireless LAN systems support 64 FFT. Thus, at least some of the non-legacy preamble may be composed of 256 FFT-based OFDM symbols. When a plurality of non-legacy STAs perform a multi-user uplink data transmission, each STA transmits at least some information of a non-legacy preamble through a sub-channel allocated to the STA. However, since the legacy preamble is transmitted on a 20 MHz channel basis, a method is required for the STAs assigned to resources on a sub-channel basis to transmit a legacy preamble in the corresponding channel.

According to an embodiment of the present invention, as shown in FIG. 14 (a), a representative STA selected from a plurality of STAs may transmit a legacy preamble 510 on behalf of the plurality of STAs assigned to the same 20 MHz channel. Various methods can be used to select the representative STA among a plurality of STAs. According to an embodiment, a STA having the highest received signal strength indication (RSSI) among a plurality of STAs assigned to the same 20 MHz channel may transmit a legacy preamble 510 for the multi-user uplink data transmission. According to another embodiment, a STA assigned to the first sub-channel among a plurality of sub-channels allocated within the same 20 MHz channel may transmit a legacy preamble 510 for the multi-user uplink data transmission.

The representative STA transmits the legacy preamble 510 in units of 20 MHz, and then transmits the non-legacy preamble 520 through the sub-channel allocated to the STA. The remaining STAs other than the representative STA transmit the non-legacy preamble 520 through the sub-channel allocated to the corresponding STA after the transmission of the legacy preamble 510 of the representative STA. The plurality of STAs transmit the non-legacy preamble 520 through allocated sub-channels at the same time.

According to another embodiment of the present invention, as shown in FIG. 14 (b), a plurality of STAs assigned to the same 20 MHz channel may simultaneously transmit the legacy preamble 510. In this case, the legacy preamble 510 transmitted by a plurality of STAs is set to the same waveform. Each STA transmits the legacy preamble 510 set in the same waveform in units of 20 MHz, and then transmits the non-legacy preamble 520 through a sub-channel allocated to the corresponding STA. To this end, the AP may transmit information corresponding to the legacy preamble 510 to each STA in the scheduling process. The AP receives the legacy preamble 510 from at least one STA as common information in units of 20 MHz.

FIG. 15 illustrates a method of configuring a non-legacy preamble according to an embodiment of the present invention. In the embodiment of FIG. 15, the same or corresponding parts as those of the embodiment of FIG. 14 described above will be omitted.

FIG. 15 (a) illustrates an embodiment for constructing a non-legacy preamble. Some fields of the non-legacy preamble, for example, the HE-SIG-A 522 may be composed of 64 FFT-based OFDM symbols same as the legacy preamble 510. According to an embodiment of the present invention, the HE-SIG-A 522 of the non-legacy preamble may be transmitted on a 20 MHz channel basis in common. STAs that perform the multi-user uplink data transmission transmit the legacy preamble 510 and the HE-SIG-A 522 having the same information on a 20 MHz channel basis. That is, the AP receives HE-SIG-A 522 from at least one STA as common information on a 20 MHz channel basis. Also, the STAs transmit the remaining field 524 of the non-legacy preamble through the sub-channel allocated to the corresponding STA. That is, the AP receives the remaining field 524 of the non-legacy preamble as individual information for each sub-channel allocated to each STA. In this case, the remaining fields 524 of the non-legacy preamble include HE-STF and HE-LTF.

FIG. 15 (b) illustrates another embodiment constituting the non-legacy preamble. According to another embodiment of the present invention, the HE-SIG-A 522 of the non-legacy preamble may be transmitted on a sub-channel basis. STAs that perform the multi-user uplink data transmission transmit a legacy preamble 510 having the same information on a 20 MHz channel basis. Also, the STAs may transmit the non-legacy preambles 522 and 524 through a sub-channel allocated to the corresponding STA. The STA having assigned a plurality of sub-channels as resources may repeatedly transmit the same HE-SIG-A 522 through each assigned sub-channel.

Meanwhile, although FIG. 15 illustrates a method of configuring a non-legacy preamble in a situation of the multi-user uplink data transmission, the method can be applied to the multi-user downlink data transmission as well. The HE-SIG-A 522 of the non-legacy preamble includes information necessary to interpret the non-legacy packet. For example, the HE-SIG-A 522 may include an indicator indicating whether the packet is an uplink packet or a downlink packet. According to the embodiment of the present invention, HE-SIG-A may be duplicated in units of 20 MHz when data is transmitted through a wideband channel.

Figure 16:
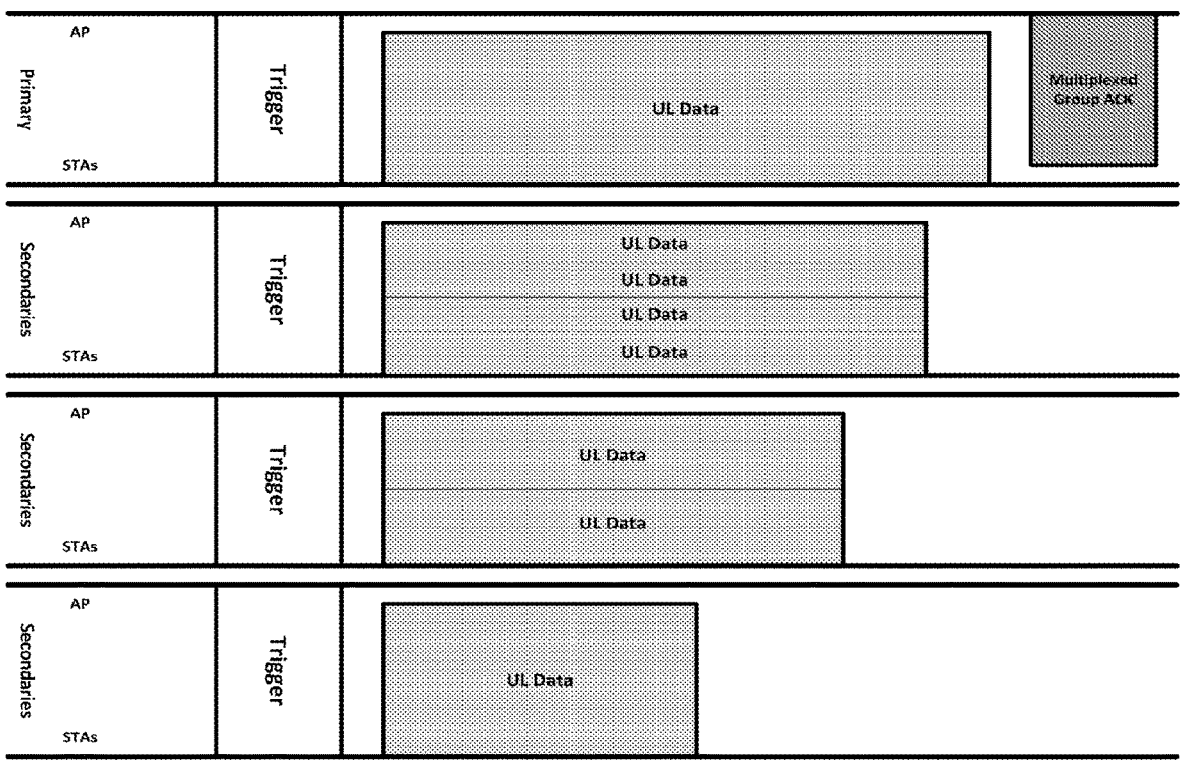
FIG. 16 illustrates a method for performing a multi-user uplink transmission according to an embodiment of the present invention.

FIG. 16 illustrates a method for performing a multi-user uplink transmission according to an embodiment of the present invention. In the embodiment of FIG. 16, the same or corresponding parts to those of the embodiments of FIGS. 9 and 10 described above will be omitted.

The multi-user uplink transmission in a non-legacy wireless LAN system may be initiated by a trigger frame. That is, the initialization step (S210) of FIG. 9 may be performed by a transmission of the trigger frame of the AP. STAs that perform the multi-user uplink transmission simultaneously transmit uplink data a predetermined IFS after the transmission of the trigger frame. The trigger frame indicates the start point of the multi-user uplink transmission and may indicate information on the channel or sub-channel allocated to each uplink transmission STA. STAs in which a channel or a sub-channel has been allocated from the AP simultaneously transmit uplink data at the time point designated by the AP. When the multi-user uplink transmission is completed, the AP transmits a multiplexed group ACK in response thereto.

According to an embodiment of the present invention, the trigger frame may include information for NAV setting of the multi-user uplink data transmission process. When the trigger frame conforms to the legacy frame format, a NAV of legacy terminals can be set based on the duration field value of the MAC header of the trigger frame. According to a further embodiment of the present invention, in order to set a NAV for hidden nodes adjacent to uplink transmission STAs, the AP may increase the coverage of the trigger frame to be more than the transmission range of a normal frame. For example, an AP may transmit the trigger frame with increased power than a normal frame. Alternatively, the AP may apply a robust MCS (Modulation and Coding Scheme) to the trigger frame as compared to a normal frame.

Figure 17:
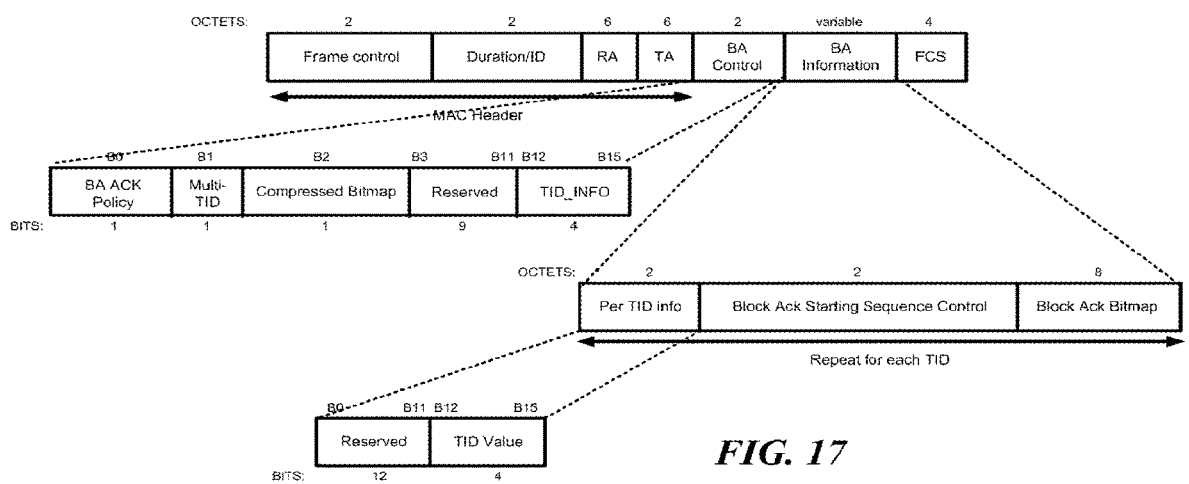
FIG. 17 illustrates a structure of a multiplexed group ACK according to an embodiment of the present invention.

FIG. 17 illustrates a structure of a multiplexed group ACK according to an embodiment of the present invention. According to an embodiment of the present invention, the multiplexed group ACK may have a frame format of a block ACK (BA).

The multiplexed group ACK includes a BA Control field and a BA Information field and may indicate block ACK information for a plurality of STAs through at least one of the fields. The block ACK information field is set to a variable length and may include a Per TID information field, a Block ACK Starting Sequence Control field, and a Block ACK Bitmap field. The Per TID information field includes a reserved field (B0 to B11) and a TID Value field (B12 to B15).

According to an embodiment of the present invention, ACK information for a plurality of STAs may be represented by using a reserved field of the Per TID information field. More specifically, the reserved field includes AID information of a recipient STA and an indicator indicating whether or not the ACK is a block ACK. For example, the reserved field may be composed of 12 bits (i.e., B0 to B11). A particular bit, for example, B11, may indicate whether the frame is a block ACK or a normal ACK. In addition, some remaining bits of the reserved field, for example, 11 bits of B0 to B11, may indicate AID information of the recipient STA of the corresponding frame.

The block ACK information field having the above-described configuration may be repeated for each Traffic ID (TID). Since the block ACK information field has a variable length, AIDs for all STAs participating in the multi-user uplink transmission may be inserted into the block ACK information field through the reserved field. For example, the block ACK information field is allocated for each STA, and may be repeated by the number of recipient STAs. Thus, an AID, a Block ACK Starting Sequence Control field, and a Block ACK Bitmap field for each STA may be included in the block ACK information field. On the other hand, when the indicator B11 of the reserved field indicates a normal ACK, the Block ACK Starting Sequence Control field and the Block ACK Bitmap field may be omitted from the block ACK information field.

According to an embodiment of the present invention, information indicating a BA for a multiple STAs (e.g., a Multi-STA BA) may be included in a block ACK control field. More specifically, the block ACK control field includes a Multi-TID field B1, a Compressed Bitmap field B2 and a reserved field B3 to B11, and whether the frame is a Multi-STA BA is indicated through at least one of the fields. For example, a specific bit among the reserved field B3 to B11 may be used as a bit indicating the Multi-STA BA.

Figure 18:
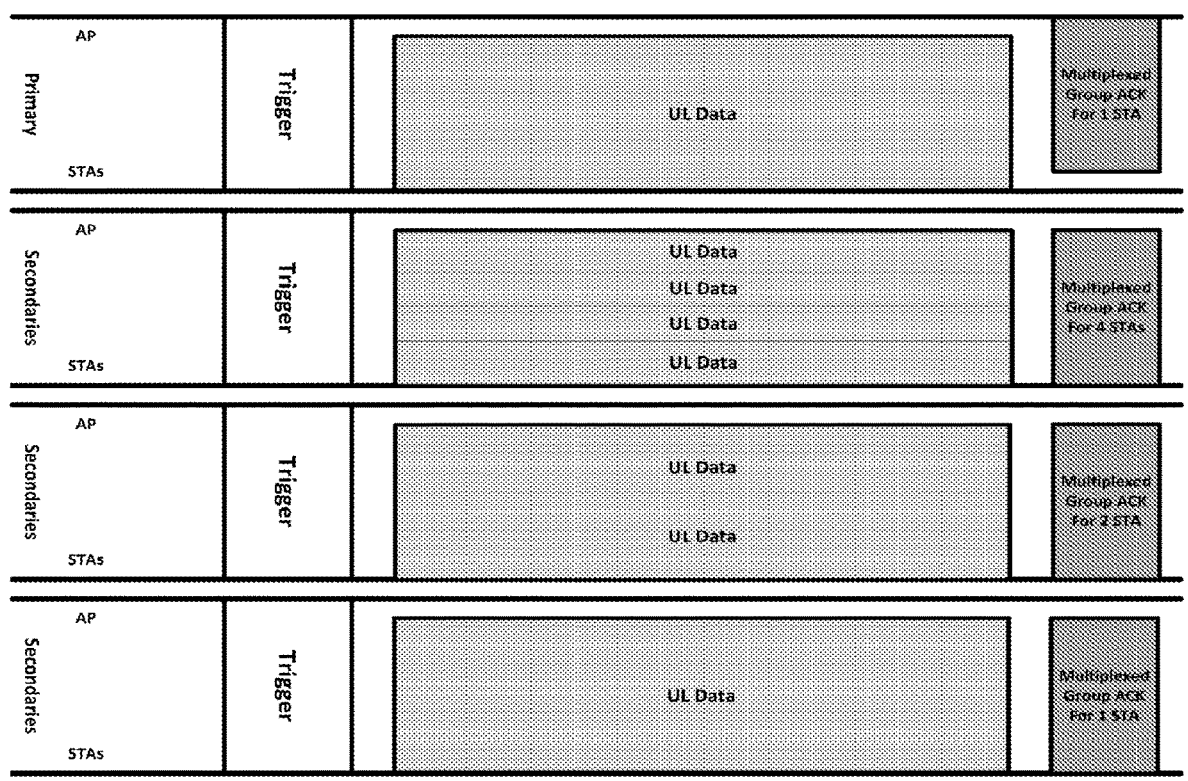
FIG. 18 illustrates a method of transmitting a multiplexed group ACK according to an embodiment of the present invention.

FIG. 18 illustrates a method of transmitting a multiplexed group ACK according to an embodiment of the present invention. In the embodiment of the present invention, the multiplexed group ACK includes a Multi-STA BA for a plurality of STAs as described above.

As in the above-described embodiment, uplink data for each channel in the multi-user uplink transmission may be terminated at the same time. In this case, the AP transmits a multiplexed group ACK on each channel through which the multi-user uplink data is transmitted to notify the completion of the transmission. However, if the number of STAs assigned to each channel is different as shown in FIG. 18, at least some information of the multiplexed group ACKs transmitted on each channel may have different lengths. As described above with reference to FIG. 17, the block ACK information field of the multiplexed group ACK has a variable length, and the length of the field may be longer as the number of assigned STAs increases. Depending on whether the indicator of the reserved field indicates a block ACK, some fields such as a Block ACK Starting Sequence Control field and a Block ACK Bitmap field may be omitted. However, according to the embodiment of the present invention, the L-SIG and the HE-SIG-A may be duplicated as common information in units of 20 MHz when data is transmitted through a wideband channel. Therefore, the multiplexed group ACKs transmitted on each channel should have the same length based on the value of a PPDU length field included in the L-SIG.

Figure 19:
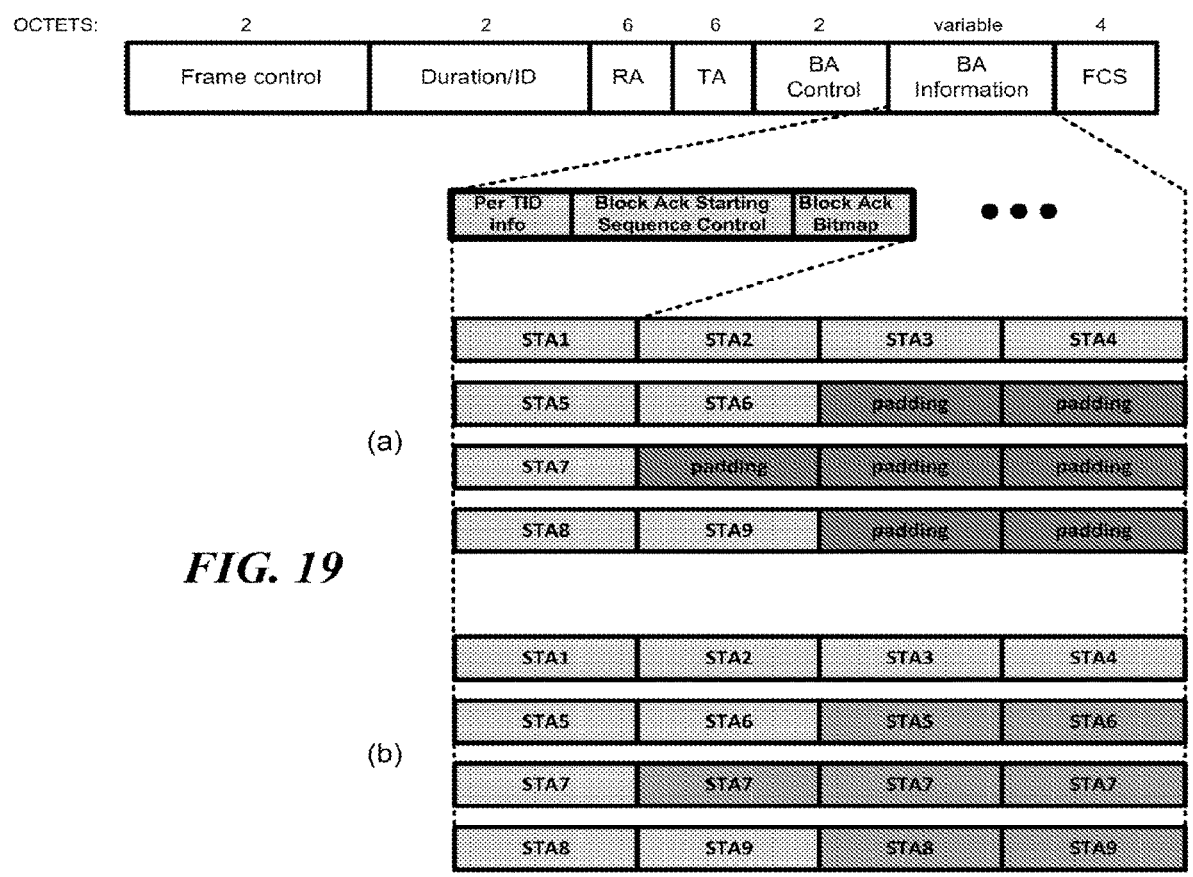
FIG. 19 illustrates a length alignment method of block ACKs according to an embodiment of the present invention.

FIG. 19 illustrates a length alignment method of block ACKs according to an embodiment of the present invention. In an embodiment of the present invention, the block ACK includes a multiplexed group ACK and a Multi-STA BA. In the embodiment of FIG. 19, the same or corresponding parts as those of the embodiment of FIG. 17 described above will be omitted.

The AP transmits a block ACK in response to the multi-user uplink data. The AP may transmit the block ACK to a plurality of STAs using a multi-user downlink transmission. According to an embodiment of the present invention, the AP may transmit a block ACK for a corresponding STA on a channel through which multi-user uplink data is transmitted.

In this case, the amount of ACK information of the block ACK transmitted on each channel may be different. Referring to FIG. 19, ACK information of STA1, STA2, STA3 and STA4 is included in the block ACK transmitted on the first channel, and ACK information of STA5 and STA6 is included in the block ACK transmitted on the second channel. In addition, ACK information of STAT is included in the block ACK transmitted on the third channel, and ACK information of STA8 and STA9 is included in the block ACK transmitted on the fourth channel.

According to an embodiment of the present invention, the transmission of the block ACK may be terminated at the same time for each channel. That is, the AP may set the lengths of block ACKs transmitted on a plurality of channels to be the same.

According to an embodiment of the present invention, as shown in FIG. 19 (a), the AP may perform padding on a block ACK transmitted through at least one channel to match the termination point of the block ACK transmissions in each channel. That is, the AP may perform padding on the block ACKs of the second channel to the fourth channel in reference to the length of the block ACK of the first channel having the largest amount of ACK information. According to an embodiment, the padding of the block ACK may be implemented with zero padding. However, the present invention is not limited thereto and the padding may also be implemented with one padding.

According to another embodiment of the present invention, as shown in FIG. 19 (b), the AP may insert duplicated ACK information into a block ACK transmitted through at least one channel to match the termination point of the block ACK transmissions in each channel. That is, the AP may insert duplicated ACK information into the block ACKs of the second channel to the fourth channel in reference to the length of the block ACK of the first channel having the largest amount of ACK information. In this case, the duplicated ACK information includes at least one of a Per TID information field, a Block ACK Starting Sequence Control field, and a Block ACK Bitmap field for each STA.

If the indicator B11 of the reserved field indicates a block ACK, the Per TID information field, the Block ACK Starting Sequence Control field and the Block ACK Bitmap field for at least one STA may be inserted in duplicate into the block ACK transmitted on the second to fourth channels. However, if the indicator B11 of the reserved field indicates a normal ACK, the Block ACK Start Sequence Control field and the Block ACK Bitmap field may be omitted from the block ACK information field. Therefore, the Per TID information field for at least one STA may be inserted in duplicate into the block ACK transmitted through the second to fourth channels. As described above, the Per TID information field of the block ACK information field includes AID information of the recipient STA.

Figure 20:
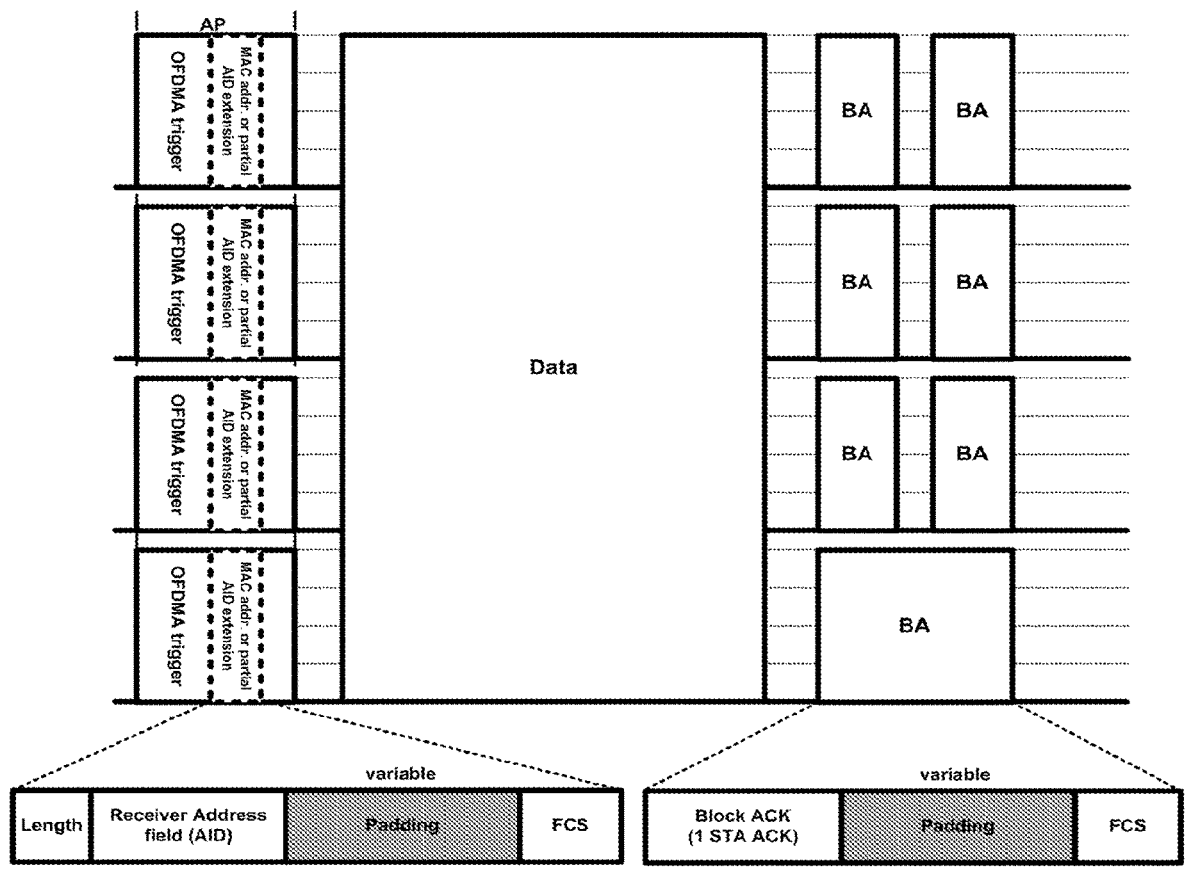
FIG. 20 illustrates a method of frame length alignment by padding in a multi-user simultaneous transmission according to an embodiment of the present invention.

FIG. 20 illustrates a method of frame length alignment by padding in a multi-user simultaneous transmission according to an embodiment of the present invention.

According to an embodiment of the present invention, a trigger frame that triggers the multi-user simultaneous transmission may be also be padded. In the multi-user uplink data transmission and the multi-user downlink data transmission, a different number of STAs may be assigned to each channel. The trigger frame may include AID information of the STA assigned to each channel, and the amount of information of the transmitted trigger frame may be different for each channel.

According to an embodiment of the present invention, a predetermined padding may be performed before a Frame Check Sequence (FCS) field of the trigger frame. Thus, the transmission of the trigger frame may be terminated at the same time in each channel through which the trigger frame is transmitted. Also, through the padding of the trigger frame, the STAs can acquire additional processing time to participate in the multi-user simultaneous transmission in response to the trigger frame. Meanwhile, according to another embodiment of the present invention, the duplicated AID information may be inserted before the FCS field of the trigger frame.

As described above, when different numbers of STAs are assigned to each channel in the multi-user simultaneous transmission process, the amount of information of the block ACK transmitted in response to the multi-user data may be different for each channel. According to an embodiment of the present invention, padding may be performed on a block ACK of another channel in reference to a length of a block ACK of a channel to which a largest number of STAs are allocated. In this case, the padding may be performed before the FCS field of the block ACK.

Figure 21:
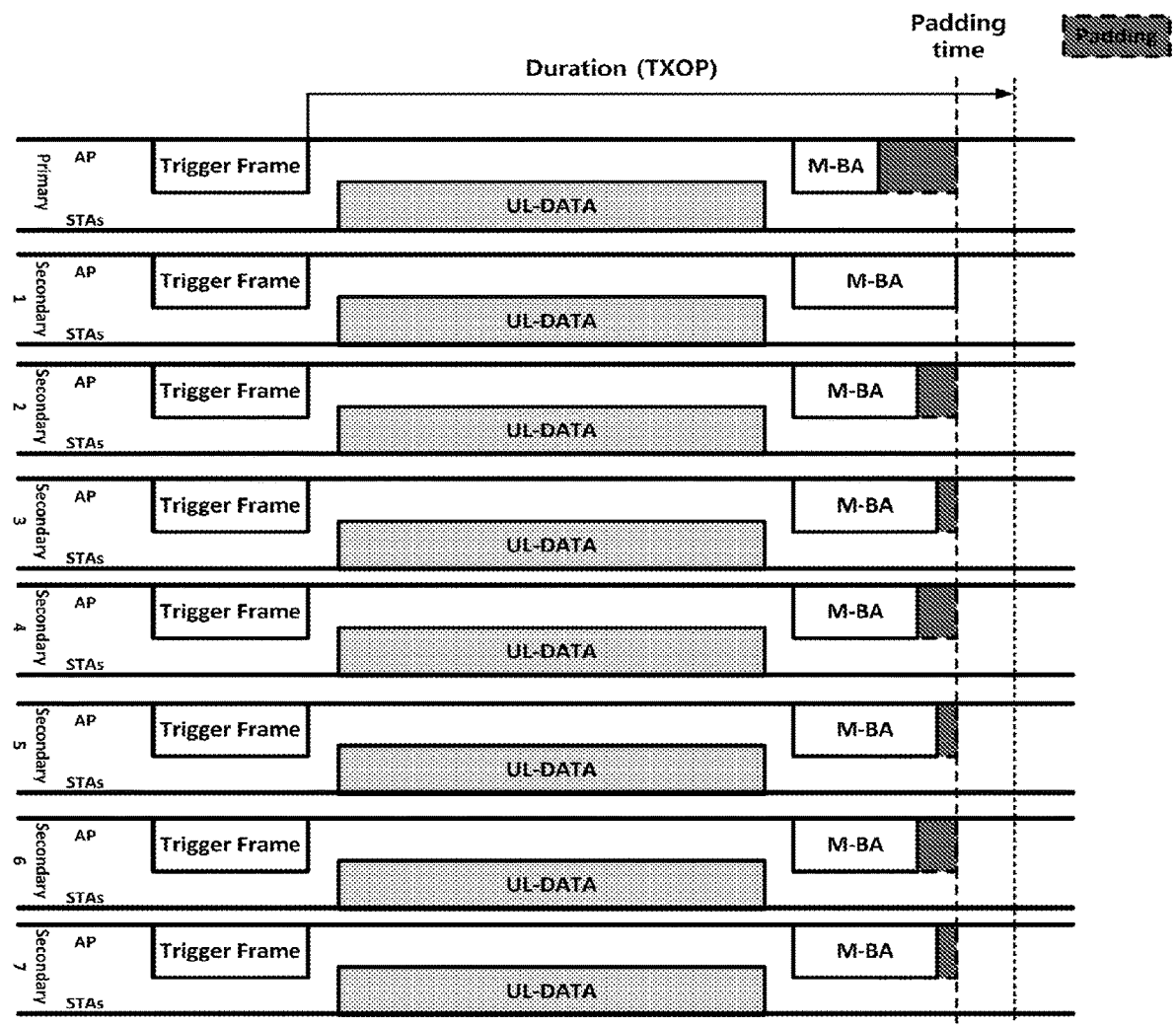
FIG. 21 illustrates a method of transmitting a multiplexed block ACK when a plurality of channels are used for a multi-user uplink transmission.

FIG. 21 illustrates a method of transmitting a multiplexed block ACK when a plurality of channels are used for a multi-user uplink transmission. In the present invention, the multiplexed block ACK (M-BA) may indicate the above-described multiplexed group ACK.

As described above, the AP may transmit a multiplexed block ACK for a corresponding STA on a channel through which multi-user uplink data is transmitted. Therefore, the length of the multiplexed block ACK varies depending on the number of STAs assigned to the corresponding channel, the reception state of the multi-user uplink data, and the like. Therefore, at the time when the AP transmits the trigger frame, the actual length of the multiplexed block ACK cannot be predicted.

According to the embodiment of the present invention, the AP may set the TXOP value of the trigger frame by predicting the maximum time required for a multi-user uplink data transmission. The maximum time may be set to a time required for transmitting an M-BA using the block ACK option to all STAs on the channel through which the largest number of STAs are allocated. Therefore, when the actual multi-user uplink data transmission is completed, the length of the actual M-BA may be different for each channel depending on the uplink data reception result.

If M-BAs of different lengths are transmitted for each channel, access of other terminals may be allowed an AIFS time after the transmission completion of M-BA on some channels. When the M-BA on the primary channel is set to be the shortest as in the embodiment of FIG. 21, other terminals may perform access to the primary channel. However, since the AP cannot switch its state until the M-BA transmissions on other channels are completed, the transmission attempts of other terminals may be ignored or the competition of an access attempt of the AP may be disadvantageous.

Therefore, according to the embodiment of the present invention, the AP may set the lengths of multiplexed block ACKs transmitted through a plurality of channels to be the same. To this end, the AP may perform padding on the multiplexed block ACKs transmitted through at least one channel to match the termination points of the multiplexed block ACK transmissions in each channel. According to an embodiment, the padding scheme of IEEE 802.11ac may be used for the padding of multiplexed block ACKs.

Meanwhile, the transmission of the multiplexed block ACK may be terminated before the TXOP set in the trigger frame. According to an embodiment, the AP may return the remaining TXOP after the transmission of the multiplexed block ACK is completed. According to another embodiment, the AP may perform additional operations such as a control frame transmission during the remaining TXOP after the transmission of the multiplexed block ACK is completed.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

MODE FOR INVENTION

As above, related features have been described in the best mode.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal, the terminal comprising:
a transceiver; and
a processor,
wherein the processor is configured to:
receive, through the transceiver, a trigger frame indicating uplink transmission of one or more terminals, wherein the trigger frame includes an association identifier (AID) field, and
perform, through the transceiver, an uplink transmission in response to the trigger frame,
wherein the AID field is used to identify whether the trigger frame includes a padding field to which padding is applied, and
wherein the trigger frame further includes the padding field when the AID field is set to a specific value.

2. The wireless communication terminal of claim 1, wherein a duration of the padding field is set based on a time needed for the one or more terminals to process the trigger frame.

3. The wireless communication terminal of claim 1, wherein the padding field is contained before a frame check sequence (FCS) field included in the trigger frame.

4. The wireless communication terminal of claim 1, wherein the AID field indicates a start of the padding, when the AID field is set to the specific value.

5. The wireless communication terminal of claim 4, wherein the predetermined AID field information is duplicated bit information in an AID field.

6. The wireless communication terminal of claim 1, wherein the padding is applied in the trigger frame by using duplicated information.

7. The wireless communication terminal of claim 6, wherein the padding is applied in the trigger frame by duplicating the predetermined AID field information.

8. The wireless communication terminal of claim 1, wherein the processor is further configured to:
generate an uplink packet to perform the uplink transmission, and
perform the uplink transmission in response to the trigger frame by using the generated uplink packet,
wherein a padding is applied to the uplink packet to terminate the uplink transmission at a designated time.

9. The wireless communication terminal of claim 1, wherein the AID field is set to the specific value according to the number of user information for the one or more terminal.

10. The wireless communication terminal of claim 1, wherein all bits of the padding field are set by repeating a specific value when the padding field is included in the trigger frame.

11. A wireless communication method of a wireless communication terminal, comprising:

receiving a trigger frame indicating uplink transmission of one or more terminals,
wherein the trigger frame includes an association identifier (AID field); and
performing an uplink transmission in response to the trigger frame,
wherein the AID field is used to identify whether the trigger frame includes a padding field to which padding is applied, and
wherein the trigger frame further includes the padding field when the AID field is set to a specific value.

12. The wireless communication method of claim 11, wherein a duration of the padding field is set based on a time needed for the one or more terminals to process the trigger frame.

13. The wireless communication method of claim 11, wherein the padding field is contained before a frame check sequence (FCS) field included in the trigger frame.

14. The wireless communication method of claim 11, wherein the AID field indicates a start of the padding, when the AID field is set to the specific value.

15. The wireless communication method of claim 14, wherein the predetermined AID field information is duplicated bit information in an AID field.

16. The wireless communication method of claim 11, wherein the padding is applied in the trigger frame by using duplicated information.

17. The wireless communication method of claim 16, wherein the padding is applied in the trigger frame by duplicating the predetermined AID field information.

18. The wireless communication method of claim 11, further comprising:
generating an uplink packet to perform the uplink transmission, and
performing the uplink transmission in response to the trigger frame by using the generated uplink packet,
wherein a padding is applied to the uplink packet to terminate the uplink transmission at a designated time.

* * * * *